Dec. 15, 1964  H. A. BENTLEY  3,161,440
VEHICLE WHEEL SECURING MEANS
Filed July 29, 1963  2 Sheets-Sheet 1
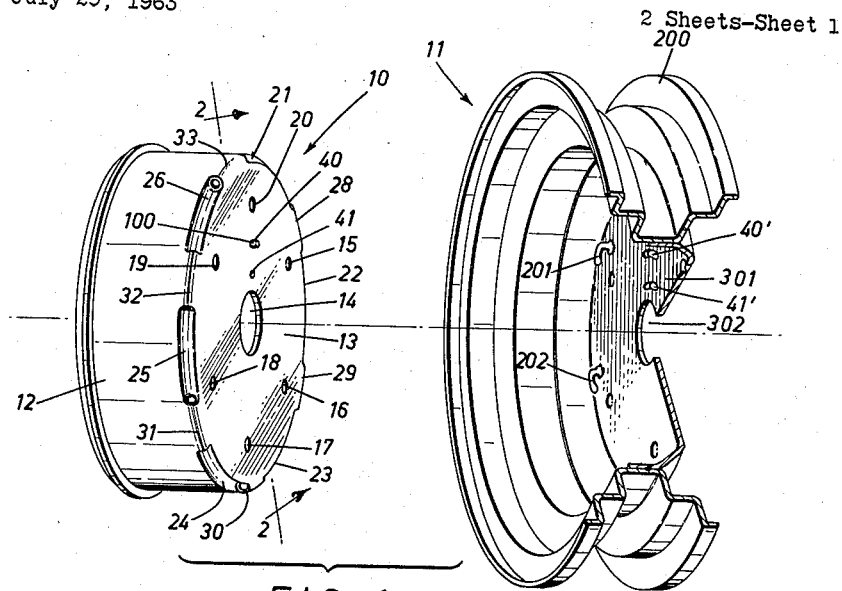
FIG. 1
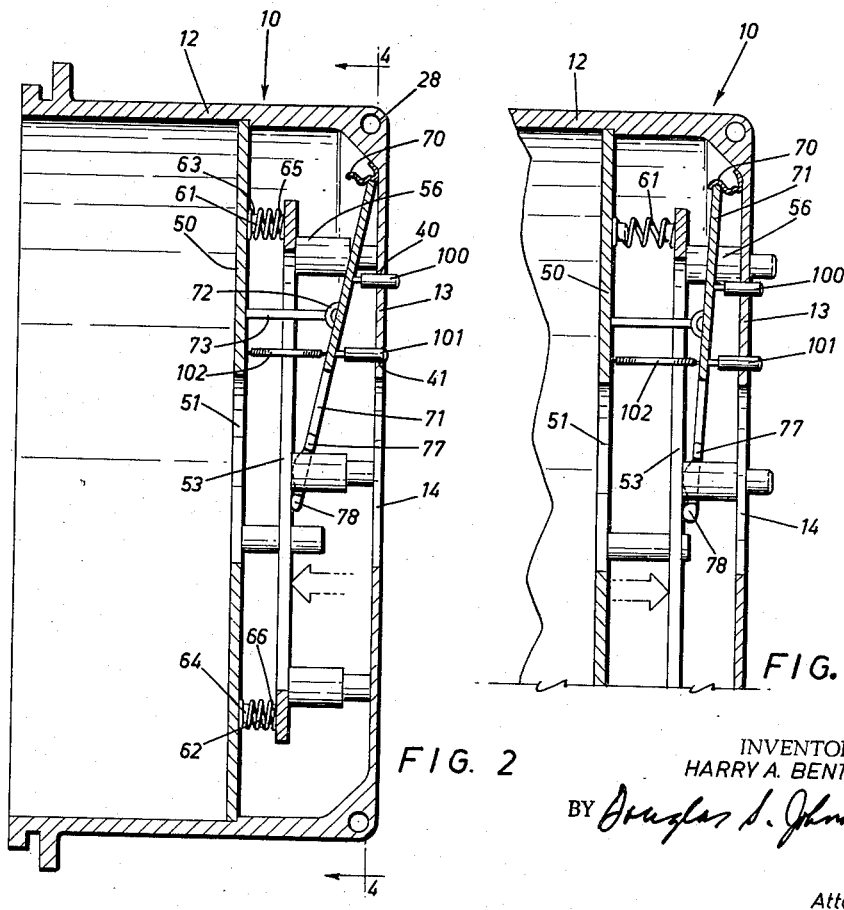
FIG. 2
FIG. 3
INVENTOR.
HARRY A. BENTLEY
BY
Attorney Dec. 15, 1964   H. A. BENTLEY   3,161,440
VEHICLE WHEEL SECURING MEANS
Filed July 29, 1963
2 Sheets-Sheet 2

INVENTOR.
HARRY A. BENTLEY
BY *Douglas S. Johnson*
Attorney

United States Patent Office 3,161,440
Patented Dec. 15, 1964

3,161,440
VEHICLE WHEEL SECURING MEANS
Harry A. Bentley, 87 Caroline St., Waterloo,
Ontario, Canada
Filed July 29, 1963, Ser. No. 298,295
1 Claim. (Cl. 301—9)

The present invention relates to wheel securing means for vehicles and more particularly to securing means for tires of wheels of cars and trucks and like automotive vehicles.

The main object of the present invention is to provide means whereby wheels of such vehicles may be rapidly and easily secured to the hubs.

As is well known, the conventional practice is to secure the wheels to the hubs by an arrangement of bolts and nuts. Improper tightening of the nuts on the bolts can lead to incorrect alignment of the wheel with the consequent uneven tread wear and improper tightening can also lead to uneven stresses upon the bolts and the hub.

Quite apart from these objections, the bolt securing arrangement is awkward and it is accordingly a further object of the present invention to provide wheel securing means which are very safe and efficient in use. It is a further object of the invention to provide a means for rapidly and easily securing and removing wheels from the hubs of a vehicle which is simple and inexpensive to manufacture and which may be easily adapted for general use.

These and other important objects of the invention will become more apparent from the following disclosure and description taken in conjunction with the drawings in which:

FIGURE 1 is an exploded view illustrating a wheel and wheel hub in accordance with the present invention;

FIGURE 2 is a section of the wheel hub taken along line 2—2 of FIGURE 1;

FIGURE 3 is a fragmentary sectional view of FIGURE 2 illustrating the structure of the wheel hub in a wheel holding position;

Figure 4:
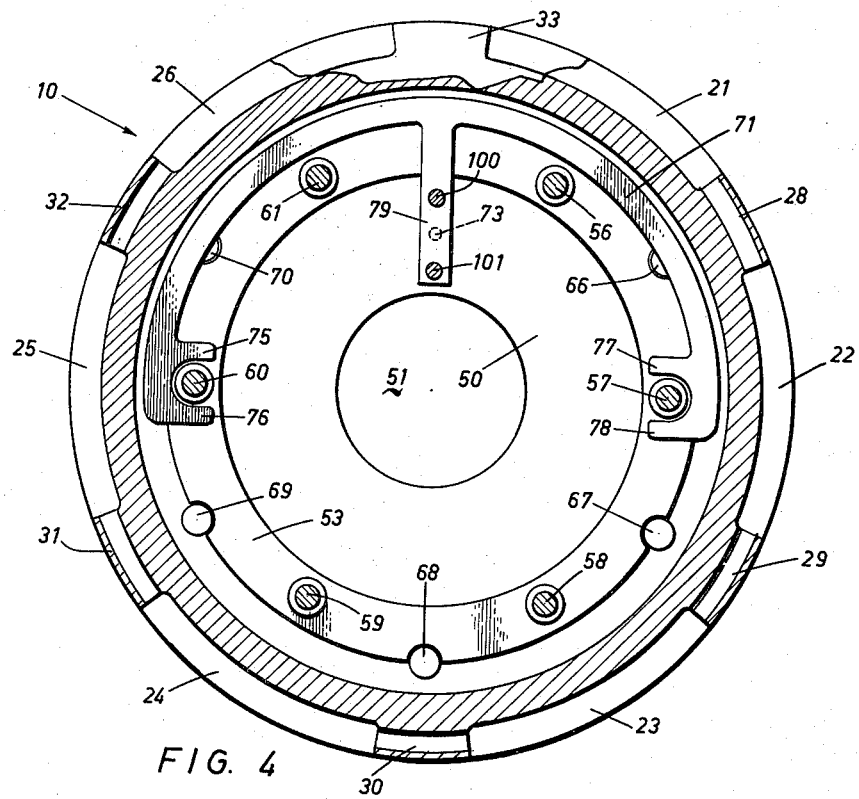
FIGURE 4 is a section taken along line 4—4 of FIGURE 2.

Referring now to the drawings in FIGURE 1 as illustrated an exploded perspective view of a wheel rim and wheel hub in accordance with the present invention. The wheel hub is generally indicated at 10 and the wheel rim at 11.

The wheel hub 10 generally comprises a casing 12 having an outer surface face 13 which is provided with a central hole 14 adapted to permit passage of an axle therethrough. Radially spaced apart from this central hole and inward of the outer periphery of surface 13 a series of spaced apart holes such as 15, 16, 17, 18, 19 and 20 are provided. About the periphery of surface 13 a plurality of open channels such as 21, 22, 23, 24, 25, 26 and 27 are provided. These open channels are spaced apart by closed channels such as 28, 29, 30, 31, 32 and 33 disposed between their respective successive open channels.

Intermediate hole 20 and axle hole 14, a pair of radially spaced apart holes 40 and 41 are provided and as seen in FIGURE 1 from hole 40, a pin 100 projects.

As will be seen from FIGURES 2, 3 and 4, within casing 12 and rearwardly spaced apart from outer surface plate 13, a backing plate 50 is rigidly secured. Backing plate 50 is provided with an axle receiving hole 51 which is aligned with hole 14 of surface plate 13.

Intermediate backing plate 50 and surface plate 13 a pin-mounting plate 53 is disposed. Pin plate 53 has rigidly mounted on its surface adjacent outer plate 13, a plurality of circumferentially spaced apart pins such as 56, 57, 58, 59, 60 and 61 which are aligned respectively with holes 15, 16, 17, 18, 19 and 20 in plate 13. Pin plate 53 is mounted on backing plate 50 by means of an arrangement of circumferentially spaced apart springs such as 61 and 62. These springs are held in a conventional manner by pins such as 63 and 64 on backing plate 50 and pins 65 and 66 on pin plate 53.

As will be evident from the drawings, pin plate 53 has a generally annular form and is maintained in aligned position by guides such as 66, 67, 68, 69 and 70 which extend between backing plate 50 and surface plate 13.

On the inner surface of surface plate 13, that is the surface adjacent pin plate 53, a spring catch 70 is provided. Spring catch 70 engages the adjacent edge of an arcuate bar 71 which is hingedly secured at 72 to backing plate 50 through shaft 73. Arcuate bar 71 includes two pairs of spaced apart diametrically opposed lugs such as 75 and 76 and 77 and 78 which are respectively disposed about the diametrically opposed pins 60 and 57. Intermediate the extremities of arcuate bar 71, an integral radial arm 79 extends inwardly therefrom. Upon this arm a pair of buttons 100 and 101 are rigidly mounted. It will be observed from FIGURE 2 that the point of hinging 72 of arm 71 to backing plate 50 is intermediate buttons 100 and 101. In alignment with button 101 and secured between the rear surface of arcuate arm 71 and backing plate 50, an auxiliary spring 102 is secured to assist in the movement of bar 71 upon pressure to buttons 100 and 101 respectively.

Wheel 11 comprises a conventional rim structure 200 to the inner surface of which a web 301 is secured. Web 201 includes a central axle receiving hole 302.

Adjacent the outer periphery of web 301, a plurality of lugs such as 201, 202, 203, 204, 205 and 206 are provided. These lugs are so arranged that they will be received by the open channels on the periphery of the wheel hub 10 and inward of these lugs, a plurality of holes such as 20', 15', 16', 17', 18' and 19' are provided. These holes correspond with the similarly numbered holes on the surface plate 13 and are radially offset therefrom.

And inward again from these last-mentioned series of holes a pair of arcuate slots such as 40' and 41' are provided. These arcuate slots are aligned with holes 40 and 41 on plate 13.

Figure 5:
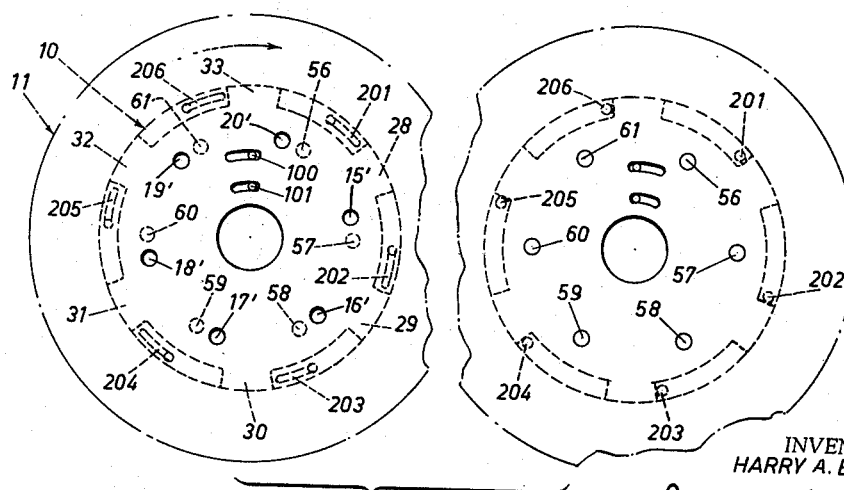
FIGURE 5 is a diagrammatic illustration of the front elevation of a wheel and wheel hub in accordance with the invention illustrating the method of assembly.

To effect engagement of the wheel 11 upon the hub 12, the wheel 11 is brought into engagement with the hub 10 as illustrated in the left hand drawing of FIGURE 5 so that the lugs such as 201, 202, 203, 204, 205 and 206 will be received in the open channels 21, 22, 23, 24, 25, 26 and 27 respectively. The wheel is then rotated in a clockwise direction so that the lugs will engage with the closed channels, for example, lug 206 will engage with closed channel 28 and the remaining corresponding lugs will engage with their corresponding closed channels. Button 100 is then pushed inward so that arcuate bar 70 will be moved in and will engage spring 70 in the manner illustrated in FIGURE 3. By this action, the pins 56, 57, 58, 59, 60 and 61 which were previously recessed or flush with the surface plate 13, will be projected outwardly through the aligned holes 15, 16, 17, 18, 19 and 20, respectively, and upon projection therefrom, will engage the corresponding holes 15', 16', 17', 18', 19' and 20' on the wheel 11.

In this manner, the wheel will be restrained from moving with respect to the hub both laterally and circumferentially and the engagement will be secure.

To remove the wheel from the rim, the procedure is reversed, namely, button 101 is depressed with the result that the arcuate arm 71 will be urged forward to assume the position originally illustrated in FIGURE 2 and the projecting pins 56, 57, 58, 59, 60 and 61 will be retracted to a position such that their outer surfaces are flush or within the outer limits of surface 13. The wheel 11 is then rotated in an anticlockwise direction and removed when the lugs such as 201, 202, 203, 204, 205 and 206 have been disengaged from their respective closed channels.

From the above, it will be evident that the inventor has in this present invention provided a simple and efficient means for securing the wheel to a hub for automotive vehicles.

It will, of course, be understood that many alternative embodiments may be provided which fall within the spirit and scope of the present invention. For example, it will be evident that an open channel structure may be substituted for the disclosed closed channel structure. That is, a peripheral channel could be provided about the wheel hub which channel has wider and narrower spaced apart portions to effectively lock the lugs in position. It will also be evident that a locking arrangement which is the equivalent of the two button system illustrated could be provided and that such a locking arrangement could be actuated by the ignition key in a manner well known to one skilled in the art. These several alternatives are deemed to fall within the spirit and the scope of the invention as defined by the appended claims.

It will also be understood that for ease of engagement, the several cooperating channels and lugs may be tapered to facilitate their mating.

What I claim is:

A vehicle wheel mounting comprising in combination a hub and a wheel having a web portion; said hub including a surface having a plurality of spaced apart channels, said web portion including a plurality of spaced apart inwardly extending hook-shaped lugs adapted to be received and engaged in said channels upon rotation relative thereto; said hub further including a plurality of spaced apart first holes in said surface and an equal plurality of retractable pins mounted behind said surface, actuating means adapted to project said pins beyond said surface each through a corresponding one of said holes, said web portion including an equal plurality of spaced apart holes corresponding to said holes of said hub, said web portion holes being radially offset and adapted to be aligned with said first hub holes upon relative rotation to receive said pins upon operation of said actuating means, said hub including a backing plate rigidly mounted in said hub rearward of said surface, a pin mounting plate movably mounted intermediate said backing plate and said surface, a plurality of pins secured to said plate in a spaced apart relationship, one pin corresponding to each of said first holes and plate guide means adapted to maintain said pins in an aligned relationship with said holes, said actuating means comprising an arcuate bar including a member extending radially of said hub rearward of said surface, said member including a first end engaging said mounting plate and a second end adapted to engage a lock in a first or second locking position, said member being hingedly connected intermediate its length to said pin mounting plate, said arcuate bar including first and second ends, each of said ends loosely engaging one of a pair of diametrically opposed pins, a pair of pins mounted on said member one on each side of said hinged connection whereby upon depression thereof, said bar moves about said hinge with an overcentre action to release and lock said wheel to said hub respectively.

References Cited in the file of this patent

UNITED STATES PATENTS

| | | |
|---|---|---|
| 1,651,105 | Schenken | Nov. 29, 1927 |
| 1,955,883 | Krewett | Apr. 24, 1934 |

FOREIGN PATENTS

| | | |
|---|---|---|
| 603,037 | Germany | Sept. 22, 1934 |